US009525381B2

(12) United States Patent
Khan et al.

(10) Patent No.: US 9,525,381 B2
(45) Date of Patent: Dec. 20, 2016

(54) METHOD AND APPARATUS FOR ELECTRICALLY ACCESSING PHOTOVOLTAIC MODULES

(75) Inventors: Imran Khan, Perrysburg, OH (US); Markus Gloeckler, Perrysburg, OH (US); Thomas Truman, Toledo, OH (US); Scott Jacoby, Sylvania, OH (US); Michael Sweet, Lambertville, MI (US); Jigish Trivedi, Perrysburg, OH (US); James E. Hinkle, Toledo, OH (US); Stephen P. Murphy, Perrysburg, OH (US)

(73) Assignee: First Solar, Inc., Perrysburg, OH (US)

( * ) Notice: Subject to any disclaimer, the term of this patent is extended or adjusted under 35 U.S.C. 154(b) by 183 days.

(21) Appl. No.: 13/615,815

(22) Filed: Sep. 14, 2012

(65) Prior Publication Data
US 2013/0076380 A1    Mar. 28, 2013

Related U.S. Application Data

(60) Provisional application No. 61/539,314, filed on Sep. 26, 2011.

(51) Int. Cl.
   *G01R 31/26* (2014.01)
   *H02S 50/10* (2014.01)

(52) U.S. Cl.
   CPC ..................... *H02S 50/10* (2014.12)

(58) Field of Classification Search
   CPC ............. G01R 31/405; G01R 31/2605; G01R 31/2648; G01R 31/27; G01R 31/2642; G01R 31/2644; G01R 31/26; H01L 31/02167; H01L 31/048; H02S 50/00; H02S 50/10; H02S 50/15

USPC .......... 324/750.01, 761.01, 501, 96; 29/593; 702/116
See application file for complete search history.

(56) References Cited

U.S. PATENT DOCUMENTS

| | | | | |
|---|---|---|---|---|
| 3,943,527 A * | 3/1976 | Hartmann | ............... | G01D 15/18 118/410 |
| 4,656,419 A * | 4/1987 | Garlick | ............. | G01R 31/2632 136/290 |
| 6,046,421 A * | 4/2000 | Ho | .................... | G11C 29/56016 209/571 |
| 6,215,323 B1 * | 4/2001 | Rennies et al. | .......... | 324/750.08 |
| 8,228,088 B1 * | 7/2012 | Hinze et al. | ............. | 324/761.01 |
| 2006/0103371 A1 * | 5/2006 | Manz | ......................... | 324/158.1 |

(Continued)

FOREIGN PATENT DOCUMENTS

| | | |
|---|---|---|
| JP | 2002-166234 A | 6/2002 |
| WO | WO 2010/090774 A1 | 8/2010 |

OTHER PUBLICATIONS

Keithley Instruments et al., "Making I-V and C-V Measurements on Solar/Photovoltaic Cells Using the Model 4200-SCS Semiconductor Characterization System," Keithley, Application Note Series, No. 2876, pp. 1-6, Oct. 2007.

*Primary Examiner* — Minh N Tang
*Assistant Examiner* — David Frederiksen
(74) *Attorney, Agent, or Firm* — Blank Rome LLP (57) ABSTRACT

An apparatus and a method for testing and/or conditioning photovoltaic modules. The apparatus includes a set of contacts for contacting electrical conductors of the module and a testing and/or conditioning system for testing and/or conditioning of the module and measuring parameters associated therewith.

31 Claims, 8 Drawing Sheets

(56) References Cited

U.S. PATENT DOCUMENTS

| | | | |
|---|---|---|---|
| 2007/0152695 A1* | 7/2007 | Bosy | G01R 31/2887 324/750.22 |
| 2009/0102453 A1* | 4/2009 | Kasahara | G01N 21/8806 324/96 |
| 2009/0256581 A1* | 10/2009 | Lu et al. | 324/715 |
| 2009/0287446 A1* | 11/2009 | Wang et al. | 702/116 |
| 2009/0301253 A1* | 12/2009 | Nishida et al. | 74/490.01 |
| 2010/0074515 A1* | 3/2010 | Zhao | G01N 25/72 382/149 |
| 2010/0236035 A1* | 9/2010 | Chung | 29/25.01 |
| 2011/0012635 A1* | 1/2011 | Lu | H02S 50/10 324/757.03 |
| 2011/0109336 A1* | 5/2011 | Lin | G01R 31/2808 324/750.18 |
| 2011/0140726 A1* | 6/2011 | Sullivan et al. | 324/756.01 |
| 2011/0204909 A1* | 8/2011 | Buehler et al. | 324/750.03 |
| 2012/0038385 A1 | 2/2012 | Eaglesham et al. | |
| 2012/0223733 A1* | 9/2012 | Gunawan et al. | 324/761.01 |

* cited by examiner

METHOD AND APPARATUS FOR ELECTRICALLY ACCESSING PHOTOVOLTAIC MODULES

CROSS-REFERENCE TO RELATED APPLICATION

The present application claims priority to U.S. Provisional Application No. 61/539,314, filed Sep. 26, 2011, the disclosure of which is hereby incorporated by reference in its entirety.

FIELD OF THE INVENTION

Embodiments of the invention relate to the field of photovoltaic power generation systems, and more particularly to methods and systems used to test and/or condition photovoltaic modules during manufacture.

BACKGROUND OF THE INVENTION

Photovoltaic (PV) modules convert solar radiation to electrical current using the photovoltaic effect. During manufacturing of the modules, minor variations in process parameters may result in modules having dissimilar performance characteristics. Dissimilar performance characteristics are undesirable because the design and performance of a photovoltaic array may rely on each module performing according to product specifications. Therefore, it is desirable to manufacture modules that exhibit similar performance characteristics when installed in the field. Moreover, it is desirable to manufacture modules that maintain similar performance characteristics over the life expectancies of the modules. An efficient way to test and/or condition manufactured modules is desired.

DETAILED DESCRIPTION OF THE INVENTION

In the following detailed description, reference is made to the accompanying drawings which form a part hereof, and in which is shown by way of illustration specific embodiments that provide a system for inline testing and conditioning of PV modules while they are manufactured. These embodiments are described in sufficient detail to enable those skilled in the art to make and use them, and it is to be understood that structural, logical, or procedural changes may be made to the specific embodiments disclosed without departing from the spirit and scope of the invention.

Figure 1:
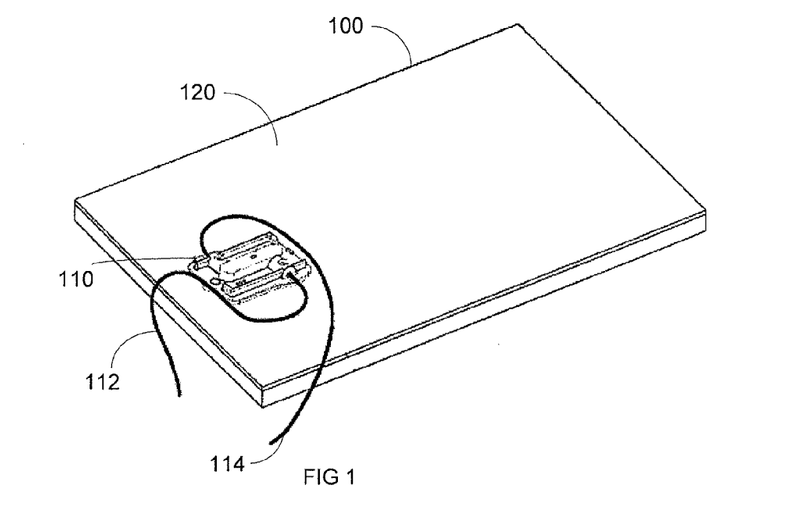
FIG. 1 is a perspective view of a PV module according to an exemplary embodiment.

FIG. 1 illustrates a bottom perspective view of a PV module 100 according to an exemplary embodiment. The PV module 100 may have any suitable geometry. For example, the PV module 100 may have a width of about 60 cm, a length of about 120 cm, a thickness ranging from 5 to 8 mm, and a weight of about 12 kg. The PV module 100 includes a plurality of layers between front and back covers that form a plurality of interconnected PV cells that generate electrical current from solar radiation.

Figure 2:
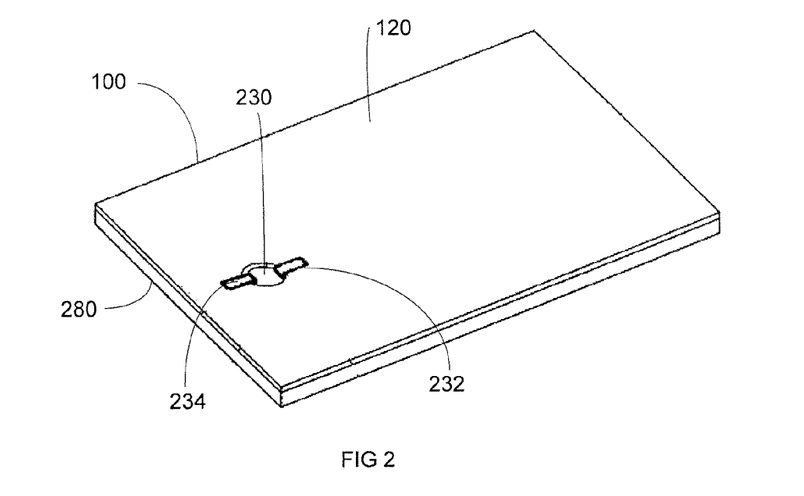
FIG. 2 is a perspective view of a partially assembled PV module according to an exemplary embodiment.

The PV cells within the PV module 100 are electrically connected to a cord plate 110 attached to a back cover 120 of the PV module 100. The cord plate allows external connections 112 and 114 to be connected to internal conductors of PV module 100. As illustrated in FIG. 2, during manufacturing of the PV module 100, positive and negative lead foils 232 and 234, which are electrically connected to the PV cells, are brought out of the PV module 100 through a hole 230 in the back cover 120. The positive and negative lead foils 232 and 234 are brought out near the front edge 280 of the PV module 100. In a subsequent step in the manufacturing process, the cord plate 110 is attached to the back cover 120 and external conductors are electrically connected to the positive and negative lead foils 232 and 234 within the cord plate 110. Positive and negative lead foils 232 and 234 may be formed of any suitable material such as, gold, silver, copper, aluminum, or other conductive metals. In one embodiment, the positive and negative lead foils 232 and 234 may be formed of conductive tape.

Figure 3A:
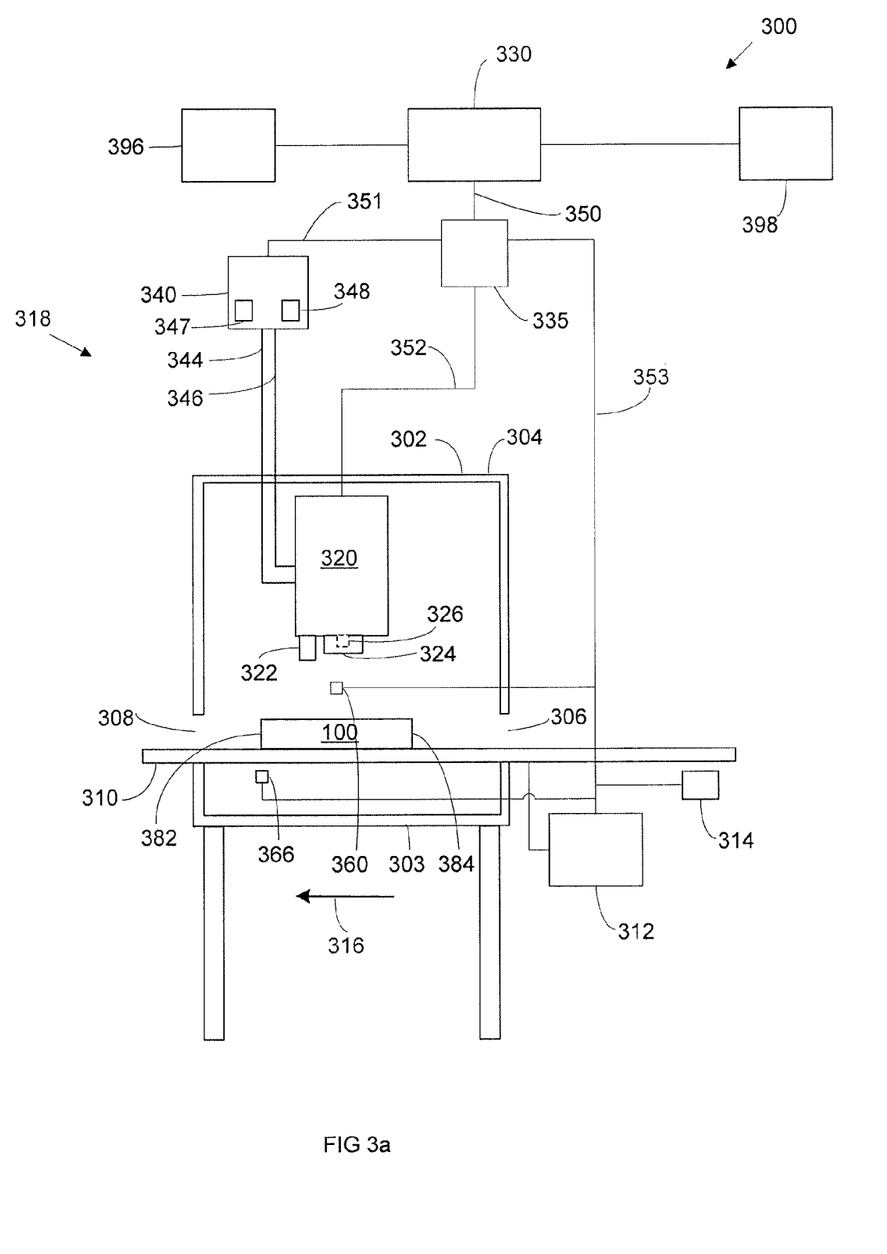
FIG. 3a is a diagram of a PV module testing and conditioning system according to an exemplary embodiment.

FIG. 3a illustrates a diagram of a testing and conditioning system (TCS) 300 according to an exemplary embodiment. The TCS 300 includes an enclosure 302, a conveyor 310, a testing and conditioning unit (TCU) 318, and a system controller 330.

Figure 3B:
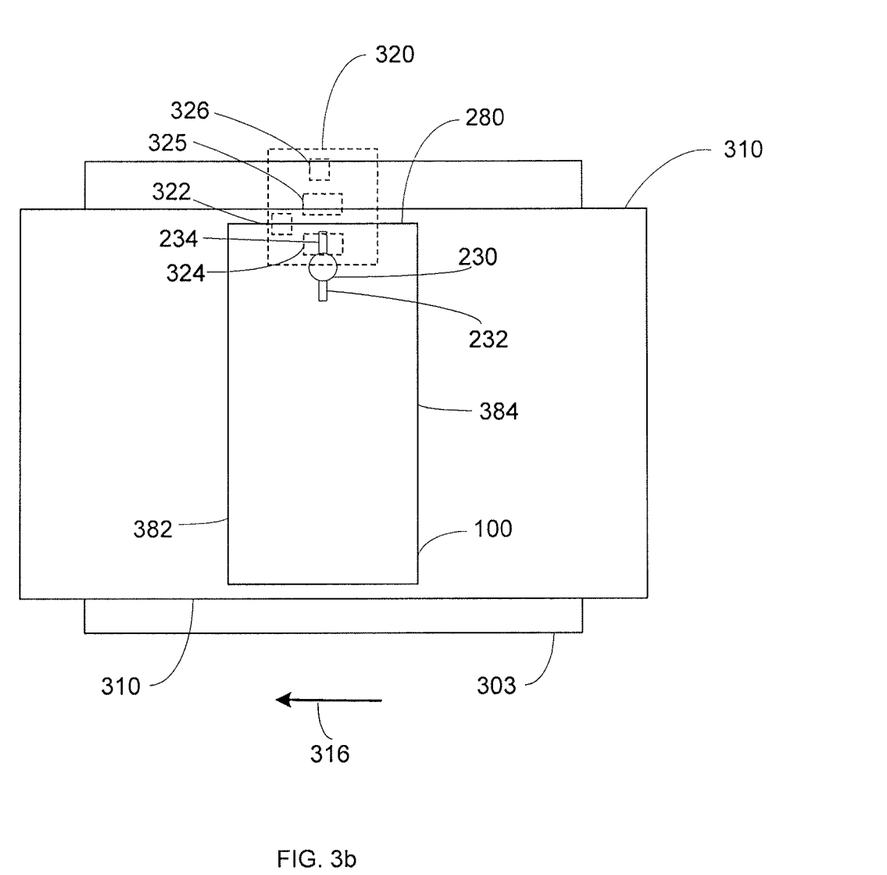
FIG. 3b is a cross-sectional top view of the diagram of FIG. 3a according to an exemplary embodiment.
Figure 3C:
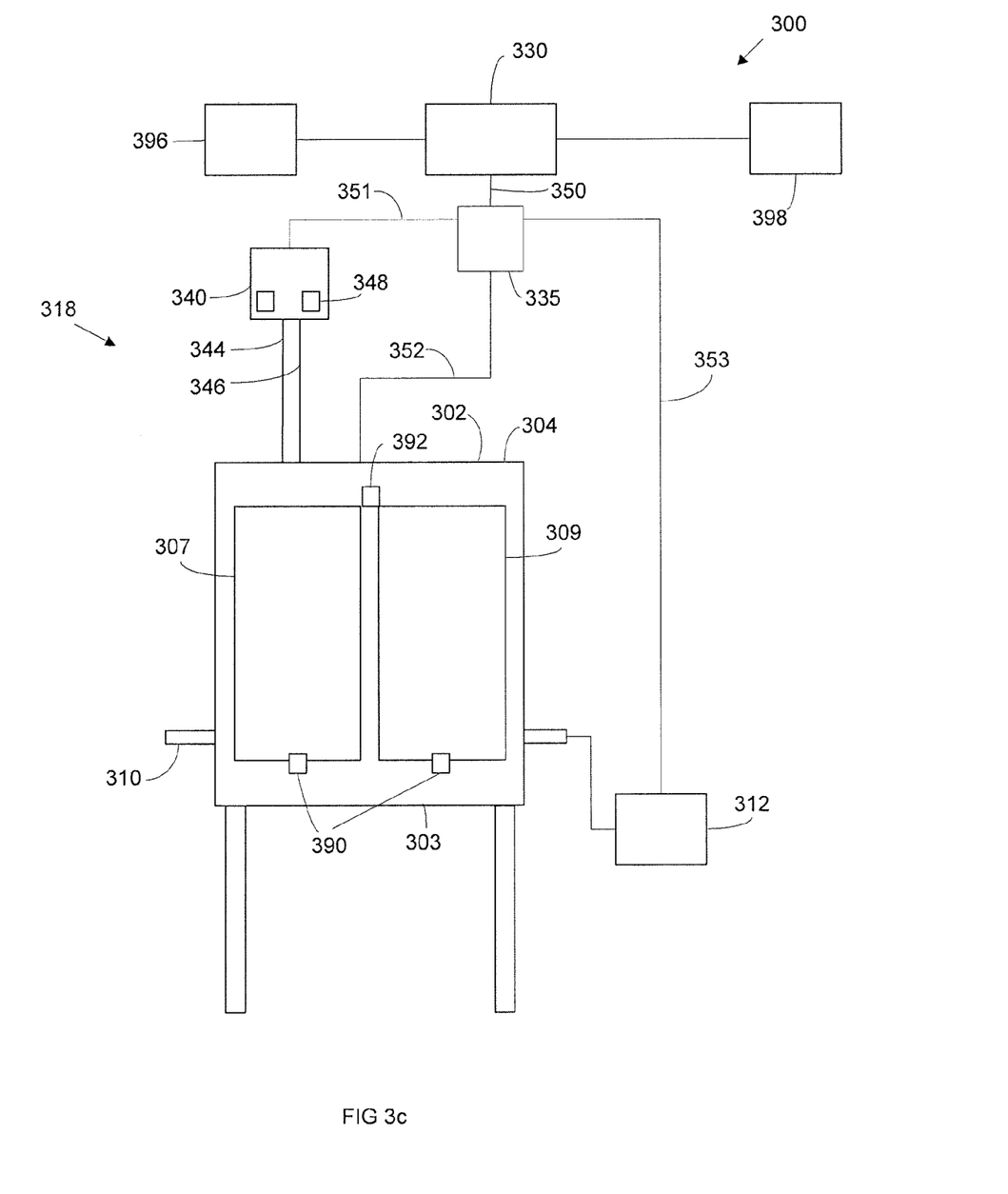
FIG. 3c is a side view of the PV module testing and conditioning system of FIG. 3a according to an exemplary embodiment.

The enclosure 302 has a box shape and includes a bottom 303, a top 304, a first opening 306 on one side and second opening 308 on an opposite side. The first and second openings 306 and 308 are large enough to allow the conveyor 310 and the PV module 100 atop the conveyor 310 to pass there through. The enclosure 302 is designed to limit access to the PV module 100 and other parts of the TCS 300 to prevent an operator or other object from conducting current applied to the PV module 100 during testing and/or conditioning. As illustrated in FIG. 3c the enclosure 302 further includes first and second access doors 307 and 309 that are used to access the interior of enclosure 302 for maintenance. The access doors 307 and 309 allow an operator to remove broken modules or to repair components within the enclosure 302. Additionally, the enclosure 302 may include solenoid-locking safety switches 390 to secure the access doors 307 and 309 and thereby secure the enclosure 302 during testing. The enclosure 302 may also contain a perimeter sensor that detects whether the access doors 307 and 309 are secure. The enclosure 302 is connected to and communicates with the control panel 335 through communication cable 352, which in turn communicates with the system controller 330 through communication cable 350. The enclosure 302 may provide information regarding the status of the enclosure 302 to the system controller 330 via the control panel 335, such as, whether the perimeter of the enclosure 302 is secured.

The conveyor 310 passes through the enclosure 302 and through the first and second openings 306 and 308 in the direction of arrow 316 and supports a PV module 100. The PV module 100 is positioned on the conveyor 310 with the leading edge 382 of the PV module 100 facing the opening 308. Furthermore, the PV module 100 is positioned on the conveyor 310 with the PV module's 100 positive and negative lead foils 232 and 234 facing the top 304 of the enclosure 302 and the PV module's 100 front edge 280 facing into the page. A scanner 314 may be positioned outside the enclosure 302 and below the conveyor 310 to read an ID of the PV module 100 as it is brought into the enclosure 302. The PV module 100 ID may be a bar code or any other computer readable identification system.

The movement of the conveyor 310 is, controlled by a conveyor controller 312. The conveyor controller 312 operates the conveyor 310 to bring the PV module 100 into the enclosure 302 and align the PV module 100 with the TCU 318. A presence sensor 366 located beneath the conveyor 310 and connected to the conveyor controller 312 is used to determine when the PV module 100 is aligned with the TCU 318. The conveyor controller 312 also is connected to and communicates with the control panel 335 through communication cable 353. The conveyor controller 312 sends status information to and receives commands from the system controller 330 via the control panel 335.

The TCU 318 includes a contact unit 320 and a power unit 340. The contact unit 320 has contact pads 324 and 325 that respectively contact the lead foils 232 and 234 of the PV module 100 during testing and conditioning of the PV module 100. The power unit 340 provides an electrical bias to the PV module 100 and measure voltage and current on the PV module 100 during testing and/or conditioning of the PV module 100. The electrical bias may be constant voltage, constant current, variable voltage, variable current, pulses of constant current, pulses of constant voltage, alternating constant or variable current and constant or variable voltage, or any combination thereof. In one embodiment, a relay may also be utilized with the power unit 340 to provide electrical bias to the PV module 100.

The contact unit 320 is positioned within the enclosure 302 between the conveyor 310 and the top 304 of the enclosure 302. The contact unit 320 includes a plunger switch 322, first and second contact pads 324 and 325 (as illustrated in FIG. 3b), and an edge sensor 326. The plunger switch 322 is used to sense the presence of a module 100 below contact unit 320 while the edge sensor 326 is used to align the contact pads 324 and 325 over the positive and negative lead foils 232 and 234 respectively of the PV module 100 in a direction perpendicular to the direction of PV module 100 conveyance during testing and conditioning of the PV module 100. The plunger switch 322, edge sensor 326, and first and second contact pads 324 and 325 are further illustrated and described with respect to FIG. 4. A control panel 335 is provided to operate and control the contact unit 320. The control panel 335 is also connected to and communicates with system controller 330 through communication cable 350. The control panel 335 may also connect to the power unit 340 via communication cable 351, contact unit 320 via communication cable 352, and the sensors (e.g. 360 and 366), scanner 314, and conveyor controller 312 via communication cable 353. The contact unit 320 sends status information to the control panel 335, and ultimately the system controller 330 and receives commands from the system controller 330 via the control panel 335.

FIG. 3b illustrates a top view of the diagram of FIG. 3a according to an exemplary embodiment with the contact unit 320 in a home position. The contact unit 320 resides in the home position during periods when the PV module 100 is not being conditioned or tested. In the home position, the portion of the contact unit 320 positioned closest to the conveyor 310 is maintained at least 2.5 inches from the conveyor 310. This clearance distance prevents the contact unit 320 from scratching or otherwise damaging the PV module 100 when it is brought in and out of the enclosure 302. When a PV module 100 is brought into the enclosure 302, the conveyor 310 positions the PV module 100 so that the contact unit 320 is centered between the leading and trailing edges 382 and 384 of the PV module 100. Centering the contact unit 320 between the leading and trailing edges 382 and 384 of the PV module 100 aligns the contact pads 324 and 325 with the lead foils 232 and 234 in the direction of PV module 100 conveyance. As mentioned above, the edge sensor 326 is then used to center the contact pads 324 and 325 and align them with the lead foils 232 and 234.

Referring again to FIG. 3a, the power unit 340 is located outside of the enclosure 302 and is connected to the contact unit 320 by positive and negative wires 344 and 346. In another embodiment, the power unit 340 may be contained within the enclosure 302. The power unit 340 supplies current and voltage to the PV module 100 by way of the contact unit 320 and positive and negative wires 344 and 346. More particularly, the power unit 340 supplies current and voltage to the positive and negative lead foils 232 and 234 of the PV module 100 by way of the contact pads 324 and 325 of the contact unit 320. When the power unit 340 is enabled by the controller 330, current flows between the power unit 340 and the PV module 100. When the power unit 340 is disabled by the controller 330, current stops flowing from the power unit 340.

The power unit 340 may operate in a constant current mode with a current set point ranging between 0 to 11.0 amps with an accuracy of +/−0.15 amps. The power unit 340 may also supply an adjustable voltage that ranges between 0 and 300 volts. In total, the power unit 340 may provide up to 3300 watts of power to the PV module 100. In another embodiment, the power unit 340 may also operate in a varying current mode with a current set point ranging between 0 to 11.0 amps with an accuracy of +/−0.15 amps and a voltage ranging between 0 and 300 volts. Furthermore, in another embodiment, the power unit 340 may operate in a mixed mode and provide varying levels of current and voltage.

The power unit 340 further includes voltage sensor 347 and current sensor 348 used to measure the voltage and current within the PV module 100 during testing and/or conditioning of the PV module 100. For example, in a testing mode, the power unit 340 may measure the voltage and/or current generated by the PV module 100 when the PV module 100 is exposed to light. In a conditioning mode, the electrical bias provided by the contact unit 320 to the PV module 100 during a conditioning event may be monitored by the voltage and current sensors 347 and 348. Using voltage sensor 347, the power unit 340 measures the voltage between the positive and negative lead foils 232 and 234 of the PV module 100. In another embodiment, the power unit 340 uses the voltage sensor 347 to measure the voltage on a voltage divider that corresponds to the voltage between the positive and negative lead foils 232 and 234. Using the current sensor, the power unit 340 measures the actual current flow within the PV module 100.

The power unit 340 is connected to and communicates with the control panel 335 through communication cable 351. The power unit 340 receives commands from the system controller 330 via the control panel 335 and the power unit 340 sends data, such as voltage and/or current measurements, and status information to the system controller 330 via the control panel 335.

Figure 4:
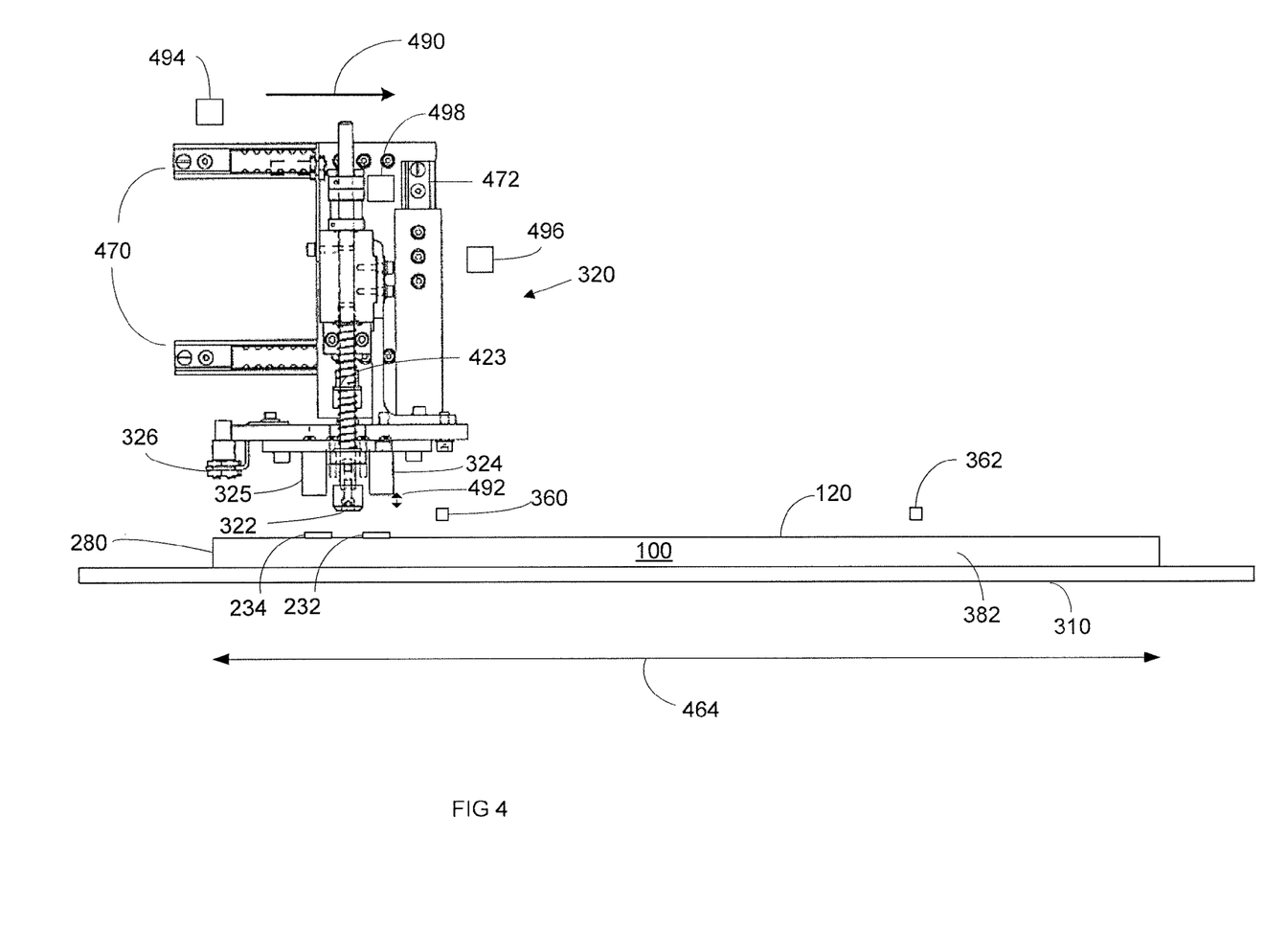
FIG. 4 is a side view of a portion of the PV module testing and conditioning system of FIG. 3a according to an exemplary embodiment.

The TCS 300 may further include first and second temperature sensors 360 and 362 (as illustrated in FIG. 4) within the enclosure 302. The temperature sensors 360 and 362 are positioned above the conveyor 310 and are centered between the leading and trailing edges 382 and 384 of the PV module 100. For example, as illustrated in FIG. 4, the first temperature sensor 360 is positioned one-quarter of the length 464 of the PV module 100 from the front edge 280 of the PV module 100 and the second temperature sensor 362 is positioned three-quarters of the length 464 of the PV module 100 from the front edge 280. The first and second temperature sensors 360 and 362 are used to measure the temperature of the PV module 100 before, during, and after testing. In one embodiment, the temperature sensors 360 and 362 may be non-contact pyrometers. In another embodiment, the temperature sensors 360 and 362 may be contact sensors that move into and out of contact with the PV module 100. The temperature sensors 360 and 362 are connected to and communicate with system controller 330 via the control panel 335 to send the temperature readings of the PV module 100.

As illustrated in FIG. 3a, the system controller 330 is connected to and communicates with various components in the TCS 300 through communication cable 350 and the control panel 335 according to one embodiment. In another embodiment, the system controller 330 may communicate with components in the TCS 300 using a wireless network, Bluetooth, or other means of communication. In yet another embodiment, the system controller 330 may communicate with some of the components in the TCS 300 using a wired connection and other of the components using a wireless connection.

The system controller 330 controls the operation of the TCS 300, executes self-diagnostics, and may interface with a plant-wide communications network. In particular, the system controller 330 may support the TCS's 300 operational functions, diagnostic systems, process parameters, status reporting, program download functions, and program upload functions. To allow for self-diagnostics, the system controller 330 may include diagnostic software to allow for trouble shooting causes of process alarms. For example, the software may store alarm histories that include event details such as the type of alarm, the time stamp of the alarm, and the time stamp of the TCS 300 reset following the alarm. The diagnostic software may also allow for viewing and trouble shooting of machine functions through the network connection.

The data that is received by the system controller 330 from the TCS 300 may be collected, displayed, transmitted, and stored. For example, data concerning the PV module 100, including testing and conditioning data, may be displayed on a console 398 to an operator. The data may also be transmitted and stored in a database 396. The data may be transmitted to the database 396 by way of a network server. For example, in one embodiment, the server may be an OPC server and the database 396 may be an SQL database. Furthermore, the data may be stored in a process table within the database 396. Within the table, an entry may be created for each PV module 100 that is processed by the TCS 300. For example, module ID, electrical current set point, actual electrical current, start time stamp, end time stamp, start voltage, end voltage, start temperature, end temperature, and equipment status may be stored for each PV module 100.

The data may be collected and continuously uploaded to the database 396 in real-time. Alternately, the data may be collected and stored locally within the system controller 330 and periodically uploaded to the database 396. In one example, data may be uploaded at the end of each testing and/or conditioning cycle. The uploaded data may include raw data collected from the sensors. Alternately, the uploaded data may also include data processed by the system controller 330. As described above, data may be uploaded from the system controller 330 to the database 396. Data may also be downloaded from the database 396 to the system controller 330. In one embodiment, the system controller 330 is a programmable logic controller. In another embodiment, the system controller 330 is a computer.

FIG. 4 illustrates a detailed front view of the contact unit 320 and the PV module 100 within the TCS 300 according to an exemplary embodiment. As illustrated in FIG. 4, the contact unit 320 is mounted on horizontal rails 470 and a vertical rail 472 to allow the contact unit 320 to move laterally and vertically.

The contact unit 320, as illustrated in FIG. 4, is in an aligned position above the PV module 100. To begin testing and/or conditioning of the PV module 100, the contact unit 320 moves from the home position, into the aligned position, and then into contact with the PV module 100. Specifically, the first and second contact pads 324 and 325 are moved into electrical contact with the positive and negative lead foils 232 and 234 of the PV module 100.

To place the contact unit 320 into contact with the PV module 100 from the home position, the contact unit 320 first moves laterally, i.e. parallel to the back cover 120 of the PV module 100, in the direction of arrow 490 along the horizontal rails 470 to the aligned position. The contact unit 320 moves laterally until either the edge sensor 326 detects the front edge 280 of the PV module 100 or the contact unit 320 reaches an end position along the horizontal rails 470. If the end position along the horizontal rails 470 is reached, as determined by a horizontal position sensor 494, the contact unit 320 returns to the home position and indicates to the system controller 330 that it was unable to detect the edge of the PV module 100. If the edge sensor 326 detects the front edge 280, the contact unit 320 stops moving laterally and commences to descend toward the PV module 100 along the vertical rail 472. In one embodiment, the edge sensor 326 may be a photo eye sensor capable of identifying the location of the front edge 280 of the PV module 100 with an accuracy of 3 mm. In another embodiment, the edge sensor 326 may be another type of sensor.

The contact unit 320 descends toward the PV module 100 until the contact unit 320 reaches an end position along the vertical rail 472 as determined by a vertical position sensor 496, such as a Hall Effect sensor. With the contact unit 320 at an end position along the vertical rail 472, the first and second contact pads 324 and 325 are in contact with the positive and negative lead foils 232 and 234 respectively. The system uses the plunger 322 to verify that the contact unit 320 is on the PV module 100 and infers that first and second contact pads 324 and 325 are in contact with the positive and negative lead foils 232 and 234 respectively. The plunger 322 extends lower than the first and second contact pads 324 and 325 by a known distance 492 and is fixed to the contact unit 320 by a plunger spring 423. As the contact unit 320 descends toward the PV module 100, the plunger 322 contacts the PV module 100 before the first and second contact pads 324 and 325 contact the positive and negative lead foils 232 and 234. As the contact unit 320 continues to descend with the plunger 322 in contact with the module 100, the plunger spring 322 is compressed. A proximity switch sensor 498 detects the compression of the plunger spring 322, which indicates that the contact unit 320 contacted the module 100. The contact unit 320 then indicates to the system controller 330 that contact has been made.

In another embodiment, the contact unit 320 may use sensors to determine the vertical distance between the PV module 100 and the contact pads 324 and 325 and place the contact pads 324 and 325 into contact with the PV module 100. Various devices may be used to move the contact unit 320 along the horizontal rails 470 and the vertical rail 472. For example, in one embodiment, air cylinders may be used to move the contact unit 320. In another embodiment, servos, an electric motor, or a hydraulic system may be used. Furthermore, different mechanics may be used to move the contact unit 320 horizontal and vertically. For example, air cylinders may move the contact unit 320 vertically, while an electric motor may move the contact unit 320 horizontally. In any event, the placement and design of the contact unit 320 should be controlled to limit the pressure applied by the contact unit 320 to the PV module 100. For example, in one embodiment, the pressure applied by the contact unit 320 to the PV module 100 should be limited to 25 lbs of force over a 6 square inch area.

Figure 5:
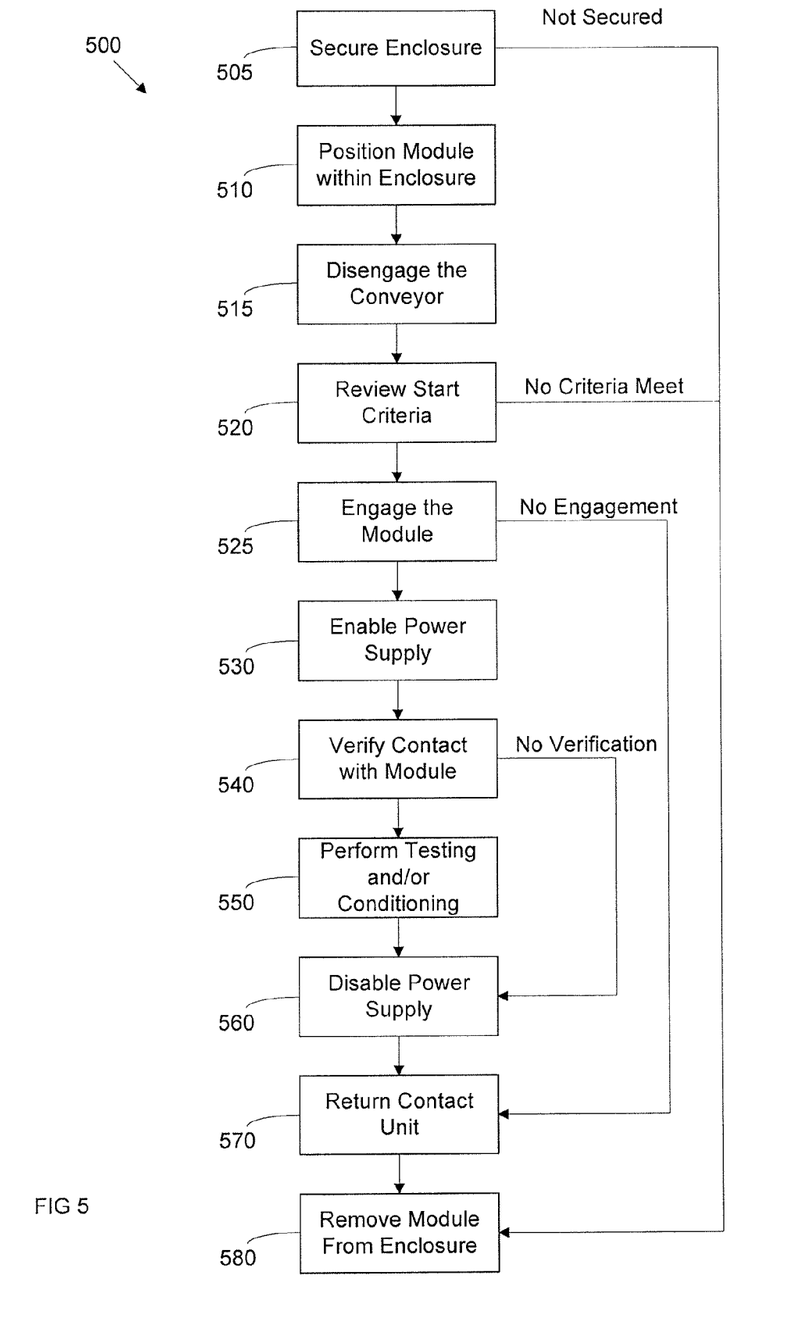
FIG. 5 is a method for testing and conditioning PV modules according to an exemplary embodiment.

FIG. 5 illustrates a method 500 implemented by the TCS 300 to test and/or condition the PV module 100 inline during manufacture of the PV module 100 according to an exemplary embodiment. To begin, in step 505, the system controller 330 waits to receive confirmation from the enclosure 302 that the doors 307 and 309 are closed and the enclosure 302 is secured. Once the system controller 330 confirms that the enclosure 302 is secured, in step 510, the system controller 330 indicates to the conveyor controller 312 to bring the PV module 100 into the enclosure 302. The conveyor controller 312 operates the conveyor 310 to bring the PV module 100 into the enclosure 302. The PV module 100 is brought into the enclosure 302 after the back cover 120 of the PV module 100 has been installed and the lead foils 232 and 234 have been brought out of the hole 230 of the back cover 120 and folded back onto the surface of the back cover 120. In one embodiment, the PV module 100 may be brought into the enclosure 302 from a laminator that installs the back cover 120. To install the back cover 120, the laminator typically heats the PV module to between 100 and 200 degrees Celsius. As a result, the PV module 100 enters the enclosure 302 with a temperature between 20 and 200 degrees Celsius.

As the PV module 100 enters the enclosure 302, a previously read ID of the PV module 100 is sent to the system controller 330 so that the system controller 330 may customize the testing and/or conditioning for the individual PV module 100. As the conveyor 310 brings the PV module 100 further into the enclosure 302, the presence sensor 366 senses the PV module 100 and sends a signal to the conveyor controller 312 which stops the conveyor 310. The PV module 100 is now aligned in the direction of PV module 100 conveyance beneath the contact unit 320 and above the temperature sensors 360 and 362 as illustrated in FIG. 3*b*. The conveyor controller 312 then sends a signal to the system controller 330 that the PV module 100 is aligned. In step 515, the system controller 330 commands the conveyor controller 312 to disengage the conveyor 310 so that no movement of the PV module 100 may occur during testing and/or conditioning of the PV module 100.

In step 520, the system controller 330 determines if the doors 307 and 309 are closed and if one or more start criteria for the testing and/or conditioning of the PV module 100 have been meet. In one embodiment, the start criteria may be programmed into the system controller 330 by the operator before hand. In another embodiment, the start criteria may be set by the operator using the console 398 in real time. In yet another embodiment, the operator may override programmed start criteria in real time using the console 398.

In one embodiment, start criteria may include the temperature of the PV module 100 falling within a specified range, such as between 20 and 200° C. The system controller 330 may determine the temperature of the PV module 100 using the temperature sensors 360 and 362. If the temperature of the PV module 100 is above 200° C., the system controller 330 may wait for the PV module 100 to cool before continuing. Additionally, if the temperature of the PV module 100 is outside the specified range, the system controller 330 may determine the start criterion has not been met. In another embodiment, the start criteria may include the TCS 300 having an allotted amount of time, such as between 0 and 10 minutes, to perform the testing and/or conditioning during the manufacturing process. For example, the start criteria may indicate that 5 minutes is needed to perform testing and/or conditioning during the manufacturing process. If the system controller 330 determines that there is only 3 minutes to perform the testing and/or conditioning, then the start criteria would not be met.

If the start criteria cannot be met, the method 500 advances to step 580. Otherwise, in step 525, the system controller 330 commands the contact unit 320 to place the contact pads 324 and 325 into contact with the lead foils 232 and 234 as explained with respect to FIG. 4. If the contact unit 320 is unable to place the contact pads 324 and 325 into contact with the lead foils 232 and 234 then the method 500 advances to step 570. If contact between the contact pads 324 and 325 and the lead foils 232 and 234 is established then, in step 530, the system controller 330 commands the power unit to output power.

Once the power unit is enabled, in step 540, the electrical contact between the contact pads 324 and 325 and the lead foils 232 and 234 is verified. To verify the electrical contact, the system controller 330 commands the power unit 340 to supply an electrical bias to the PV module 100 through the contact pads 324 and 325. For verification, a low current, for example 0.25 amps may be used. For testing and/or conditioning purposes, the current supplied by the power unit 340 may range between 0 and 11 amps and the voltage may range between 0 and 300 volts. After the electrical bias has been applied for a set amount of time, for example, 5 seconds, the power unit 340 measures the current and voltage of the PV module 100 and sends the data to the system controller 330. The system controller 330 compares the measured current and voltage to set thresholds to determine if the PV module 100 is faulty or if the contact between the contact unit 320 and the PV module 100 is not sound. For example, in one embodiment, a PV module with a measured current below 20 milliamps or a measured voltage below 20 volts would be considered faulty or as having an unsound contact between the PV module and the contact unit 320. If the measured current and voltage are found acceptable, the method 500 advances to step 550. If either of the measured current and voltage levels is found unacceptable, the method 500 advances to step 560. Furthermore, if during step 540 the system controller 330 receives data indicating that the enclosure 302 is no longer secured, the method 500 advances to step 560.

In step 550, the PV module 100 is tested and/or conditioned using electrical bias provided by the power unit 340 as controlled by the system controller 330. The electrical bias applied to the PV module 100 during the testing and conditioning may be constant, alternating, pulsating, or any combination thereof. Additionally, the system controller 330 may adjust the testing and/or conditioning procedures and conditions based on information known about the PV module 100 being tested and on feedback received during the testing and/or conditioning procedure. For example, data on the PV module 100 may be collected during the manufacturing processes that occur before the testing and/or conditioning of the PV module 100. This collected data may then be used when selecting parameters for the testing and/or conditioning of the PV module 100. For example, information relating to a vapor deposition process for the PV module 100, such as the temperature and chemical composition of the melt material, may be stored in the database 396. Based on this stored data, the testing and/or conditioning may be adjusted. Furthermore, the system controller 330 may adjust the testing and/or conditioning procedures and conditions based on real time operator input received through the console 398.

Current and/or voltage measurements may be taken during the testing or conditioning process by the power unit 340 and sent to the system controller 330. The measurements may be taken at set time intervals. For example, the measurements may be taken every 15, 30, or 60 seconds, or after any other reasonable time period. Once testing and/or conditioning is commenced, the system controller 330 also monitors stop conditions to determine when the testing and/or conditioning should end. Stop conditions may include measurable quantities, such as, the temperature of the PV module 100 falling below a set point, the voltage on the PV module 100 rising above a set point, the duration of the testing and/or condition lasting for a predetermined period. If one of the stop conditions is fulfilled, the method 500 advances to step 560. The stop conditions may be preset or determined in real time by the operator. Furthermore, if during step 550 the system controller 330 receives data indicating that the enclosure 302 is no longer secured, the method 500 advances to step 560.

In step 560, the system controller 330 commands power unit 340 to stop providing power. Then in step 570, the system controller 330 commands the contact unit 320 to return to the home position. In step 580, the system controller 330 sends a signal to the conveyor controller 312 to move the PV module 100 out of the enclosure 302. The conveyor controller 312 operates the conveyor 310 to bring the PV module 100 out of the enclosure 302. It should be understood that additional steps may be performed in the method 500 as described. Furthermore, some of the steps may not be performed, or the steps described may be performed in a different order.

Figure 6:
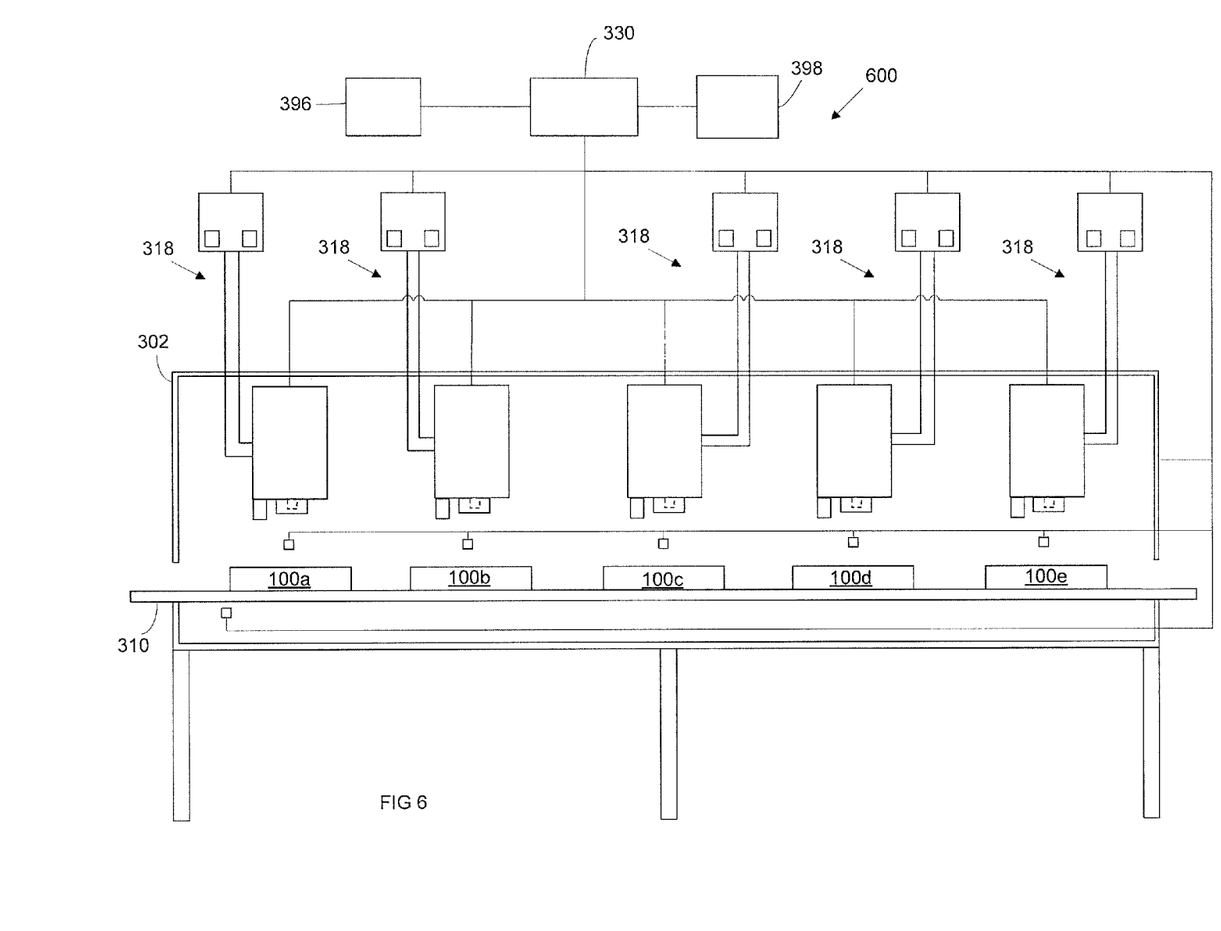
FIG. 6 is a diagram of a PV module testing and conditioning system according to an exemplary embodiment.

The TCS 300 may include more than one TCU 318 to allow the TCS 300 to process more than one PV module at a time. For example, as illustrated in FIG. 6, the TCS 600 may include five TCUs 318 spread along the conveyor 310 to enable the TCS 600 to test and/or condition five PV modules 100a-100e simultaneously according to an exemplary embodiment. In this embodiment, the five PV modules 100a-100e are brought into the enclosure 302 at the same time along the conveyor 310. The system controller 330 controls the testing and/or conditioning of each PV module 100a-100e individually and may change the testing and/or conditioning performed on an individual PV module 100a-100e based on the data previously collected for the PV module 100a-100e or based on the information collected during the testing and/or conditioning of the PV module 100a-100e. Furthermore, the system controller 330 may change the testing and/or conditioning for each individual PV module 100a-100e based on input from the operator.

The TCS 300 operates to test and/or condition every PV module 100a-100e independently. For example, if one of the five TCUs 318 is unable to locate or contact its corresponding PV module 100a-100e, the remaining PV modules 100a-100e are tested and/or conditioned. Likewise, if one of the PV modules 100a-100e fails the initial testing, the remaining PV modules 100a-100e are tested and/or conditioned. Additionally, the TCS 300 continues testing and/or conditioning each PV modules 100a-100e until a stop condition is fulfilled for that individual PV module 100a-100e. For example, if the PV module 100e has met its stop condition, the testing and/or conditioning on the PV module 100e will stop while the remaining PV modules 100a-100d continue to be tested and/or conditioned. The remaining PV modules 100a-100d will continue to be tested and/or conditioned until they fulfill a stop condition. In this example, after fulfilling the stop condition, the PV module 100e performs steps 560 and 570. When all five PV modules 100a-100e have fulfilled their stop conditions and completed steps 560 and 570, the TCS 300 performs step 580 and the testing and/or conditioning of the PV modules 100a-100e is completed.

In another embodiment, the TCS 300 operates to test and/or condition each PV module 100a-100e dependent on the condition of the remaining PV modules 100a-100e. For example, once the stop condition for one of the PV modules (e.g. 100a) is fulfilled, testing and conditioning for every module 100a-100e may stop. Likewise, in this embodiment, the TCS 300 may not perform testing and conditioning on any of the PV modules 100a-100e if one of the TCUs 318 is unable to locate or contact one of the PV modules 100a-100e.

Figure 7:
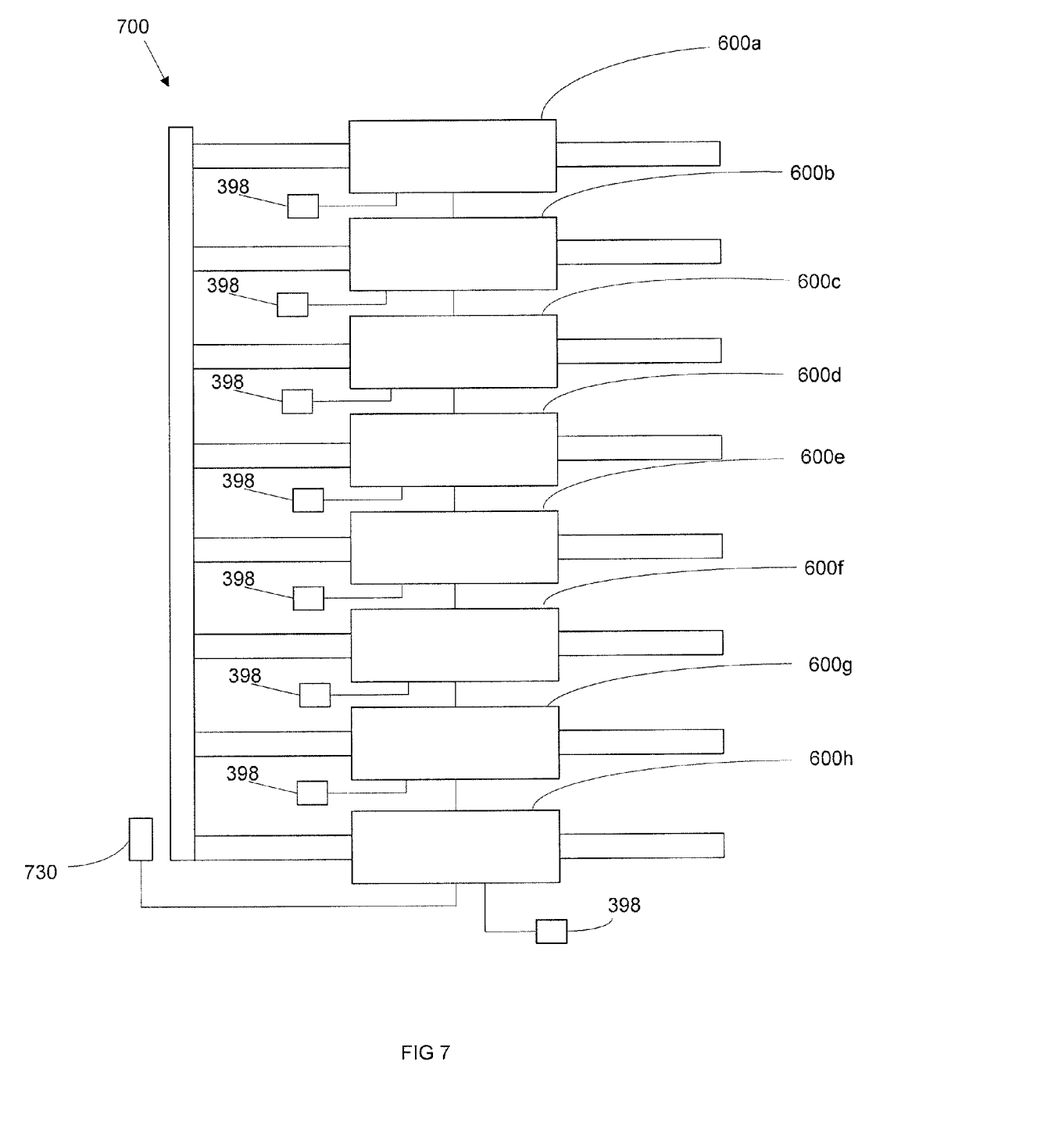
FIG. 7 is a diagram of a PV module testing and conditioning system according to an exemplary embodiment.

A system 700 may also be implemented where multiple TCSs 600 are operated in parallel. For example, as illustrated in FIG. 7, the system 700 may include eight TCSs 600a-600h operating in parallel according to an exemplary embodiment. The system 700 may simultaneously test and/or condition forty PV modules individually periodically, for example, every ten minutes. In this embodiment, each of the TCSs 600a-600h are controlled by a single system controller 730. Furthermore, each of the TCSs 600a-600h has a console 398 that allows an operator to control the testing and conditioning of each PV module 100 within the individual TCSs 600a-600h. Additionally, the TCSs 600a-600h may operate independently of each other so that the conditions and situations in one TCS 600a-600h does not affect the operation of the remaining TCSs 600a-600h. In another embodiment, a system controller may be used to control and operate each TCSs 600a-600h individually. In yet another embodiment, a single console 398 may be used for all of the TCSs 600a-600h. Other embodiments may use more or fewer TCSs as required by the system 700.

While embodiments have been described in detail, it should be readily understood that the invention is not limited to the disclosed embodiments. Rather the embodiments can be modified to incorporate any number of variations, alterations, substitutions, or equivalent arrangements not heretofore described without departing from the spirit and scope of the invention.

What is claimed as new and desired to be protected by Letters Patent of the United States is:

1. An apparatus for conditioning a photovoltaic module, the apparatus comprising:

a plurality of contacts for contacting a plurality of lead foils of the module;

a conveyor for bringing the module into and out of an enclosure;

a contact unit for placing the plurality of contacts into electrical contact with the plurality of lead foils of the module, the contact unit comprising a plunger switch configured to sense the presence of the module below the contact unit by contacting the module before or as the plurality of contacts contact the module, the plunger switch comprising a sensor configured to detect movement of the plunger;

a power unit for selectively supplying power to the plurality of contacts during conditioning operations, wherein the power unit selectively supplies electrical bias to condition the module; and a measurement unit coupled to said plurality of contacts for measuring electrical parameters of the module.

2. The apparatus of claim 1, wherein the enclosure encloses at least the plurality of contacts and the module.

3. The apparatus of claim 2, wherein the enclosure is securable to prevent access to the module or the plurality of contacts during conditioning of the module.

4. The apparatus of claim 3, wherein the enclosure generates a signal when the enclosure is accessed after being secured.

5. The apparatus of claim 1, further comprising a conveyor controller and a position sensor connected to the conveyor controller, the conveyor controller controlling movement of the conveyor and stopping the conveyor when the position sensor senses the module within the enclosure.

6. The apparatus of claim 1, further comprising a first temperature sensor for sensing a temperature of the module when the module is within the enclosure.

7. The apparatus of claim 6, further comprising a second temperature sensor for sensing the temperature of the module when the module is within the enclosure.

8. The apparatus of claim 7, wherein the first and second temperature sensors are non-contact pyrometers.

9. The apparatus of claim 1, wherein the module is conditioned when the module has a temperature between 20 and 200 degrees Celsius.

10. The apparatus of claim 1, wherein the measurement unit comprises a voltage sensor, the voltage sensor measuring a voltage across the plurality of contacts.

11. The apparatus of claim 1, wherein the measurement unit comprises a current sensor, the current sensor measuring a current passing between the plurality of contacts.

12. The apparatus of claim 1, wherein the power unit supplies a constant current between 0 and 11.0 amps to the plurality of contacts.

13. The apparatus of claim 1, wherein the power unit supplies an adjustable voltage between 0 and 300 volts.

14. The apparatus of claim 1, wherein the power unit supplies up to 3300 watts of power to the plurality of contacts.

15. The apparatus of claim 1, wherein the contact unit comprises an edge sensor configured to sense an edge of the module and align the plurality of lead foils and contacts in a direction perpendicular to the direction of module conveyance.

16. The apparatus of claim 1, further comprising a system controller that is in communication with and controls the contact unit and the power unit.

17. The apparatus of claim 16, wherein the system controller controls the contact unit and the power unit to condition the module according to a plurality of parameters.

18. The apparatus of claim 17, further comprising a database in communication with the system controller, the system controller storing and retrieving data concerning the module in the database.

19. The apparatus of claim 18, wherein the system controller adjusts the parameters for the conditioning of the module according to data stored in the database.

20. The apparatus of claim 18, wherein the system controller adjusts the parameters for the conditioning of the module according to information on a manufacturing process of the module stored in the database.

21. The apparatus of claim 16, wherein the system controller adjusts the parameters for the conditioning of the module according to input received through a console that communicates with the system controller.

22. The apparatus of claim 16, wherein the system controller adjusts the parameters for the conditioning of the module according to input received through a console that communicates with the system controller in real time.

23. The apparatus of claim 16, wherein the system controller delays conditioning of the module based on a temperature of the module.

24. A system for conditioning photovoltaic modules comprising a plurality of apparatuses of claim 1, wherein the system includes a system controller that communicates with and controls the plurality of apparatuses.

25. The system of claim 24, wherein each apparatus of the plurality of apparatuses is connected to a console that communicates with the system controller.

26. The system of claim 25, wherein the system controller adjusts the parameters for the conditioning of the module in each apparatus according to input received through the console of the respective apparatus.

27. The system of claim 24, wherein each apparatus is operated independently of the remaining plurality of apparatuses by the system controller.

28. The apparatus of claim 1, wherein the contact unit is mounted to at least one horizontal rail and at least one vertical rail configured to allow horizontal and vertical positioning of the contact unit.

29. The apparatus of claim 28, further comprising a horizontal position sensor.

30. The apparatus of claim 29, further comprising a vertical position sensor.

31. The apparatus of claim 1, wherein the plunger switch comprises a plunger spring and a proximity switch sensor configured to detect the compression of the plunger spring.

* * * * *